(12) United States Patent
Nakamura (10) Patent No.: US 9,234,555 B2
(45) Date of Patent: Jan. 12, 2016

(54) SPRING SEAT MEMBER AND SPRING ASSEMBLY EQUIPPED WITH SAME

(71) Applicant: TOGO SEISAKUSYO CORPORATION, Aichi-ken (JP)

(72) Inventor: Yuji Nakamura, Aichi-ken (JP)

(73) Assignee: Togo Seisakusyo Corporation, Aichi-Ken (JP)

( * ) Notice: Subject to any disclaimer, the term of this patent is extended or adjusted under 35 U.S.C. 154(b) by 39 days.

(21) Appl. No.: 14/235,744

(22) PCT Filed: Oct. 17, 2012

(86) PCT No.: PCT/JP2012/076862
§ 371 (c)(1),
(2) Date: Jan. 28, 2014

(87) PCT Pub. No.: WO2013/058288
PCT Pub. Date: Apr. 25, 2013

(65) Prior Publication Data
US 2014/0159295 A1     Jun. 12, 2014

(30) Foreign Application Priority Data

Oct. 18, 2011   (JP) .................. 2011-228947

(51) Int. Cl.
F16F 1/12       (2006.01)
(52) U.S. Cl.
CPC .............. F16F 1/125 (2013.01); F16F 1/122 (2013.01)
(58) Field of Classification Search
CPC ............... F16F 1/04; F16F 1/12; F16F 1/122; F16F 1/125
See application file for complete search history.

(56) References Cited

U.S. PATENT DOCUMENTS 4,373,477 A  *  2/1983  Buente et al. .............. 123/90.55
2009/0235882 A1  9/2009  Takamura et al.

FOREIGN PATENT DOCUMENTS

| CN | 101443576 A | 5/2009 |
|---|---|---|
| JP | 44-2295 | 1/1969 |
| JP | 48-11674 | 2/1973 |
| JP | 50-50538 | 5/1975 |
| JP | 54-32690 | 3/1979 |
| JP | 61-36737 | 3/1986 |
| JP | 63-57833 | 4/1988 |
| JP | 2-124331 | 10/1990 |
| JP | 3-49435 | 5/1991 |
| JP | 2004-197932 A | 7/2004 |
| JP | 2007-292271 A | 11/2007 |

* cited by examiner

Primary Examiner — Anna Momper
(74) Attorney, Agent, or Firm — Christensen Fonder P.A.

(57) ABSTRACT

A spring seat member includes a seat body having a seat portion and a shaft portion extending from the seat portion, and attachment members attached to the seat body. The spring seat member is attached to a coil spring in a state where the attachment members are attached to the seat body. The shaft portion has a groove on the outer periphery thereof that extends in the circumferential direction. The attachment members are provided with engaging portions that engage with the groove of the shaft portion. The engaging portions are selectively and elastically deformable inward or outward in the radial direction of the shaft portion. The groove has an inner wall facing the seat portion. The inner wall has an inclined surface. The inclined surface is inclined radially outward of the shaft portion as the distance from the seat portion in an extending direction of the shaft portion increases.

2 Claims, 6 Drawing Sheets

Fig. 10 ly it is an objective of the present invention to
SPRING SEAT MEMBER AND SPRING ASSEMBLY EQUIPPED WITH SAME

RELATED APPLICATIONS

The present is a National Phase entry of PCT Application No. PCT/JP2012/076862, filed Oct. 17, 2012, which claims priority from Japanese Patent Application No. 2011-228947, filed Oct. 18, 2011, the disclosures of which are hereby incorporated by reference herein in their entirety.

BACKGROUND OF THE INVENTION

The present invention relates to a spring seat member to be attached to a coil spring and a spring assembly equipped with the same.

A spring seat member to be attached to a coil spring is disclosed, for example, in Patent Document 1. This spring seat member is composed of a seat body including an engaging groove portion and a clip member including an elastically deformable elastic locking piece.

The elastic locking piece of the clip member includes a locking portion to be engaged with the engaging groove portion of the seat body to attach the clip member to the seat body. Specifically, when attaching the clip member to the seat body, the elastic locking piece of the clip member is elastically deformed to be flexed radially outward, thereby moving the engaging portion of the elastic locking piece to the engaging groove portion of the seat body. At this time, if the elastic locking piece is restored from the elastic deformation, the engaging portion of the elastic locking piece is engaged with the engaging groove portion of the seat body. Further, the spring seat member, in which the clip member is attached to the seat body, is attached to the coil spring by the elastic deformation of the clip member. Specifically, the spring seat member is inserted into the coil spring by deforming the elastic locking piece of the clip member to be flexed radially inward. At this time, if the elastic locking piece is restored from the elastic deformation, an outer end of the elastic locking piece is engaged with an end turn portion of the coil spring and the spring seat member is attached to the coil spring.

In this way, the clip member is easily attached to the seat body in the spring seat member of Patent Document 1 and the spring seat member is easily attached to the coil spring.

In such a spring seat member, the end turn portion of the coil spring is engaged with the outer end of the elastic locking piece when a force acting to pull out the spring seat member from the coil spring acts on the spring seat member. Thus, an effect of suppressing the detachment of the spring seat member from the coil spring is expected. However, in such a spring seat member, when a force acting to pull out the spring seat member is applied, a component of that force may be concentrated on a part of the elastic locking piece. This may cause the spring seat member to be detached from the coil spring due to local breakage of the elastic locking piece or due to radially inward deformation of the elastic locking piece caused by the force acting to pull out the spring seat member.

PRIOR ART DOCUMENTS

Patent Documents

Patent Document 1: Japanese Laid-Open Patent Publication No. 2007-292271

SUMMARY OF THE INVENTION

Accordingly it is an objective of the present invention to provide a spring seat member capable of effectively suppressing detachment from a coil spring and a spring assembly equipped with the same.

To achieve the foregoing objective, and in accordance with one aspect of the present invention, a spring seat member is provided that has: a seat body including a seat portion capable of contacting an end turn portion of a coil spring and a shaft portion, which extends from the seat portion and can be arranged in the coil spring; and an attachment member to be attached to the seat body. The spring seat member is attachable to the coil spring with the attachment member attached to the seat body. The attachment member includes an engaging portion that is selectively elastically deformable radial inward and outward of the shaft portion. The shaft portion includes a groove extending in a circumferential direction thereof on the outer periphery of the shaft portion. When the attachment member is attached to the seat body, the engaging portion is elastically deformed radially outward of the shaft portion, whereby the attachment member is movable along the shaft portion of the seat body until the engaging portion is loosely fitted into the groove of the shaft portion. When the attachment member is attached to the coil spring together with the seat body, the engaging portion is elastically deformed radially inward of the shaft portion, whereby the spring seat member can be inserted into the end turn portion of the coil spring, and the engaging portion is restored from the radially inward elastic deformation to be engaged with the end turn portion after insertion. The groove has an inner wall facing the seat portion. The inner wall has an inclined surface that is inclined radially outward of the shaft portion as the distance from the seat portion in an extending direction of the shaft portion increases.

According to this configuration, if a force acting to pull out the spring seat member from the coil spring acts on the spring seat member, a part of the engaging portion that contacts the inclined surface of the groove is displaced radially outward of the shaft portion along the inclined surface. Specifically, a component of a force acting to pull out the spring seat member acts to deform the engaging portion away from the shaft portion. The engaging portion already engaged with the end turn portion is more strongly pressed against the end turn portion by such deformation of the engaging portion. On the other hand, the engaging portion not engaged with the end turn portion also comes to be engaged with and pressed against the end turn portion. Further, since the part of the engaging portion that contacts the inclined surface is displaced along the inclined surface as described above, a larger part of the engaging portion is engaged with the end turn portion. In this way, the attachment orientation of the attachment member in relation to the seat body is autonomously adjusted. If a force acting to pull out the spring seat member acts on the spring seat member, a larger part of the engaging portion is engaged with the end turn portion by the synergistic effect of the deformation of the engaging portion and the autonomous adjustment relating to the attachment orientation of the attachment member. Thus, the concentration of a force on a limited area of the engaged part between the engaging portion and the end turn portion is suppressed, and the force is distributed and made uniform. As a result, the engaging portion is less likely to be locally broken or deformed radially inward of the shaft portion, which prevents the engaging portion from being disengaged from the end turn portion. Consequently, the detachment of the spring seat member from the coil spring is effectively suppressed.

Preferably, the attachment member is hollow, has a truncated conical external appearance, and includes a circular base portion and a plurality of engaging pieces that extends from a peripheral edge of the base portion and forms the engaging portion, each engaging piece is so bent that a distal end thereof extends toward the shaft portion in a bent part, the distal ends of the engaging pieces are loosely fitted into the groove, and the bent parts of the engaging pieces are engageable with the end turn portion.

According to this configuration, if a force acting to pull out the spring seat member from the coil spring acts on the spring seat member, the distal end of each engaging piece that contacts the inclined surface is displaced radially outward along that inclined surface. Specifically, a component of a force acting to pull out the spring seat member acts to deform the engaging portion away from the shaft portion, thereby achieving the advantages described above. In addition, since the engaging portion is composed of the plurality of engaging pieces, those engaging pieces are elastically deformable independently of each other. Thus, a force necessary to attach the attachment member to the seat body is reduced and attachment is facilitated. Further, a force necessary to insert the attachment member and the seat body into the end turn portion with the attachment member attached to the seat body is also reduced and the spring seat member can be easily attached to the coil spring. Furthermore, since the engaging pieces are elastically deformable independently of each other, each engaging piece is elastically deformed in conformity with the shape of the end turn portion even if there is a dimensional error of the end turn portion. Thus, the engaging pieces can be more reliably engaged with the end turn portion. Further, since the bent parts of the engaging pieces having a relatively high rigidity are engaged with the end turn portion, the damage of the parts of the engaging pieces engaged with the end turn portion can also be effectively suppressed.

Preferably, the attachment member is a ring member in the form of a C-ring, and the ring member forms the engaging portion, and the ring member is loosely fitted into the groove so that an inner peripheral part of the ring member is capable of contacting the inclined surface of the groove, and an outer peripheral part of the ring member is engageable with the end turn portion of the coil spring.

According to this configuration, when a force acting to pull out the spring seat member acts, the inner peripheral part of the ring member that contacts the inclined surface is displaced radially outward of the shaft portion along the inclined surface. By this, a force for deforming the ring member to radially enlarge it acts on the ring member as a component of the force to pull out the spring seat member. As a result, the advantages as described above are obtained.

In accordance with another aspect of the present invention, a spring seat member is provided that has: a seat body including a seat portion capable of contacting an end turn portion of a coil spring and a shaft portion, which extends from the seat portion and can be arranged in the coil spring; and an attachment member to be attached to the seat body. The spring seat member is attachable to the coil spring with the attachment member attached to the seat body. The attachment member includes an engaging portion that is selectively elastically deformable radial inward and outward of the shaft portion. The shaft portion includes a groove extending in a circumferential direction thereof on the outer periphery of the shaft portion. When the attachment member is attached to the seat body, the engaging portion is elastically deformed radially outward of the shaft portion, whereby the attachment member is movable along the shaft portion of the seat body until the engaging portion is loosely fitted into the groove of the shaft portion. When the attachment member is attached to the coil spring together with the seat body, the engaging portion is elastically deformed radially inward of the shaft portion, whereby the spring seat member can be inserted into the end turn portion of the coil spring, and the engaging portion is restored from the radially inward elastic deformation to be engaged with the end turn portion after insertion. The spring seat member being characterized in that a surface of the engaging portion that is loosely fitted into the groove and contacts the inner wall of the groove has an inclined surface that is inclined radially inward of the shaft portion as the distance from the seat portion in an extending direction of the shaft portion decreases.

According to this configuration, if a force acting to pull out the spring seat member from the coil spring acts on the spring seat member, a force acts on the engaging portion in a radially outward direction of the shaft portion as a component of a force by the contact of the inclined surface of the engaging portion with the groove. As a result, the advantages as described above are obtained.

Moreover, a spring assembly having the above-mentioned spring seat member and a coil spring is provided. The spring seat member is attached to an end turn portion of the coil spring.

According to this configuration, in the spring assembly in which the spring seat member is attached to the coil spring, the engaging portion of the spring seat member is less likely to be locally broken or deformed radially inward of the shaft portion, which prevents the engaging portion from being disengaged from the end turn portion. Consequently, the detachment of the spring seat member from the coil spring can be effectively suppressed.

According to the present invention, it is possible to provide a spring seat member capable of effectively suppressing detachment from a coil spring and a spring assembly equipped with the same.

DETAILED DESCRIPTION OF THE PREFERRED EMBODIMENTS

First Embodiment

Hereinafter, a first embodiment of this invention will now be described based on FIGS. 1 to 4.

In the following description, "upward", "downward", "leftward" and "rightward" directions are respectively defined based on the configuration shown in FIG. 1.

Figure 1:
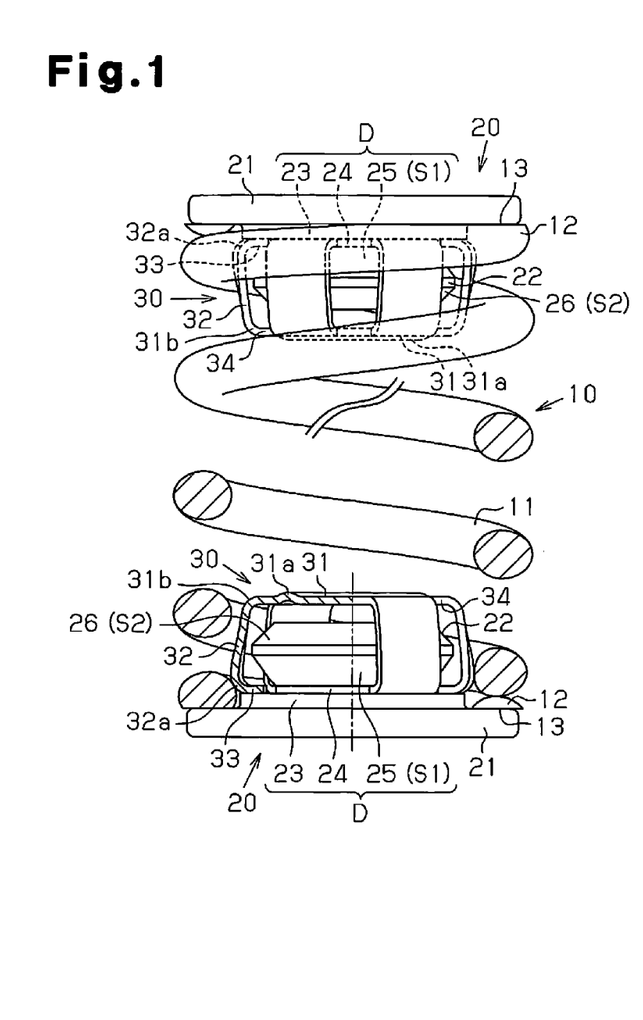
FIG. 1 is a partially cut-away cross-sectional view of a spring assembly of a first embodiment.

As shown in FIG. 1, a spring assembly is provided with a coil spring 10 and a pair of spring seat members to be attached to the opposite ends of the coil spring 10. Each spring seat member includes a seat body 20 and a leaf spring 30 attached to the seat body 20, and the leaf spring 30 acts as an attachment member. The spring assembly can be applied to a damper of a lock-up clutch of a torque converter of an automatic transmission for a vehicle. Further, the coil spring 10 includes a coil portion 11 wound to have a predetermined number of active coils and a pair of end turn portions 12 formed on the opposite ends of the coil portion 11.

Next, the spring seat member will be described.

Figure 2:
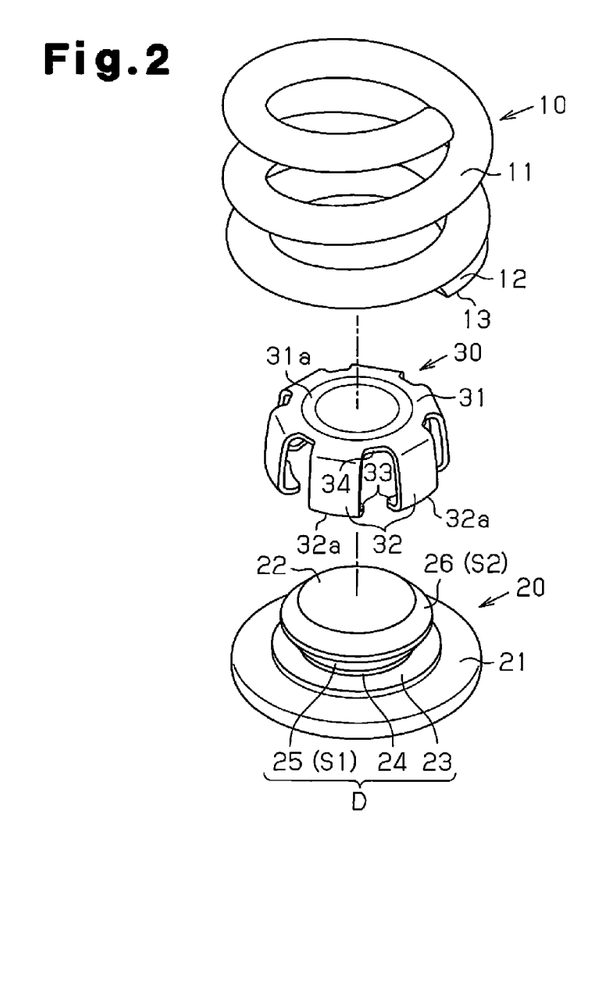
FIG. 2 is an exploded perspective view of the spring assembly of the first embodiment.

As shown in FIGS. 1 and 2, the spring seat member is composed of two components, i.e. the seat body 20 and the leaf spring 30 respectively made of a metal material. The seat body 20 includes a disk-shaped seat portion 21 and a substantially cylindrical shaft portion 22 concentrically projecting from the seat portion 21. As shown in FIG. 1, a ground end surface 13 of the end turn portion 12 can contact a surface of the seat portion 21 facing the coil spring 10.

Further, the shaft portion 22 is formed with a large-diameter portion 23, a small-diameter portion 24, an increasing-diameter portion 25 and a decreasing-diameter portion 26 successively from the seat portion 21 toward the tip of the shaft portion 22. The large-diameter portion 23 of the shaft portion 22 is disk-shaped and has an outer diameter, which is smaller than the inner diameter of the end turn portion 12 of the coil spring 10 and largest on the shaft portion 22. Further, the small-diameter portion 24 is cylindrically shaped and has the smallest outer diameter on the shaft portion 22. The largest outer diameters of the increasing-diameter portion 25 and the decreasing-diameter portion 26 are smaller than the outer diameter of the large-diameter portion 23.

A surface of the large-diameter portion 23 distant from the seat portion 21, the outer peripheral surface of the small-diameter portion 24 and a wall surface of the increasing-diameter portion 25 define a groove D, which extends over the entire circumference along the outer periphery of the shaft portion 22. The wall surface of the increasing-diameter portion 25 facing the seat portion 21 on the shaft portion 22 has an inclined surface S1, which is inclined such that the outer diameter of the increasing-diameter portion 25 increases as the distance from the seat portion 21 increases. On the other hand, a wall surface of the decreasing-diameter portion 26 has an inclined surface S2, which is inclined such that the outer diameter of the decreasing-diameter portion 26 decreases as the distance from the seat portion 21 increases.

Further, the seat body 20 is manufactured, for example, by a process for forming the seat portion 21 and the shaft portion 22 by forging materials of the seat portion 21 and the shaft portion 22 and a process for forming the large-diameter portion 23, the small-diameter portion 24, the increasing-diameter portion 25 and the decreasing-diameter portion 26 by rolling the shaft portion 22.

As shown in FIGS. 1 and 2, the leaf spring 30 is formed of a metal material to be hollow and have a truncated conical external appearance. The leaf spring 30 includes a substantially disk-shaped base portion 31, which has an outer diameter smaller than the inner diameter of the end turn portion 12 of the coil spring 10. The base portion 31 is formed with a ring-shaped reinforcing rib 31a.

Further, the base portion 31 is formed with a plurality of peripheral edge bent portions 31b at equal angular intervals in a circumferential direction along the peripheral edge thereof. An engaging piece 32, which acts as an engaging portion, extends from each peripheral edge bent portion 31b toward the seat portion 21, and is inclined radially outward as the distance from the seat portion 21 decreases. Further, a slit 34 extending up to the peripheral edge of the base portion 31 is formed between adjacent engaging pieces 32. Thus, parts of the respective engaging pieces 32 between the peripheral edge bent portions 31b and the tips are radially elastically deformable independently of each other.

Each engaging piece 32 extending from the peripheral edge bent portion 31b is bent radially inward of the shaft portion 22 at an engaging bent portion 32a and the distal end of each engaging piece 32 forms a locking portion 33 to be loosely fitted into the groove D. The engaging bent portion 32a bent in this way has a relatively high rigidity in the engaging piece 32. Further, the respective engaging bent portions 32a are arranged along one circle and the diameter of this circle is set to be larger than the inner diameter of the end turn portion 12 of the coil spring 10 in a state where the engaging pieces 32 are not elastically deformed. Furthermore, the diameter of this circle is set such that the engaging pieces 32 are engageable with the inner periphery of the end turn portion 12 in a state where the engaging pieces 32 are elastically deformed. Further, the respective locking portions 33 are arranged along one circle and the diameter of this circle is set to be smaller than the largest outer diameters of the increasing-diameter portion 25 and the decreasing-diameter portion 26 of the shaft portion 22 and larger than the outer diameter of the small-diameter portion 24 of the shaft portion 22. Further, the engaging piece 32 is bent such that each locking portion 33 extends orthogonally to an extending direction of the shaft portion 22. The length of each locking portion 33 is set to be longer than a radial distance of the shaft portion 22 from the inner peripheral surfaces of the coil portion 11 and the end turn portion 12 to a part of the shaft portion 22 where the outer diameters of the increasing-diameter portion 25 and the decreasing-diameter portion 26 are largest. Furthermore, the length of each locking portion 33 is set to be shorter than the distance from the peripheral edge bent portion 31b to the engaging bent portion 32a.

Further, the diameter of the circle on which each engaging bent portion 32a is arranged is set to be larger than the largest outer diameters of the increasing-diameter portion 25 and the decreasing-diameter portion 26 of the shaft portion 22. Further, the distance from the peripheral edge bent portion 31b to the locking portion 33 along the axis of the shaft portion 22 is set to be longer than the shaft portion 22. By this, the leaf spring 30 is configured to be attachable to the seat body 20 such that the shaft portion 22 is accommodated into the space defined by the base portion 31 and the engaging pieces 32.

Figures 3A, 3B, 3C, 3D, 3E:
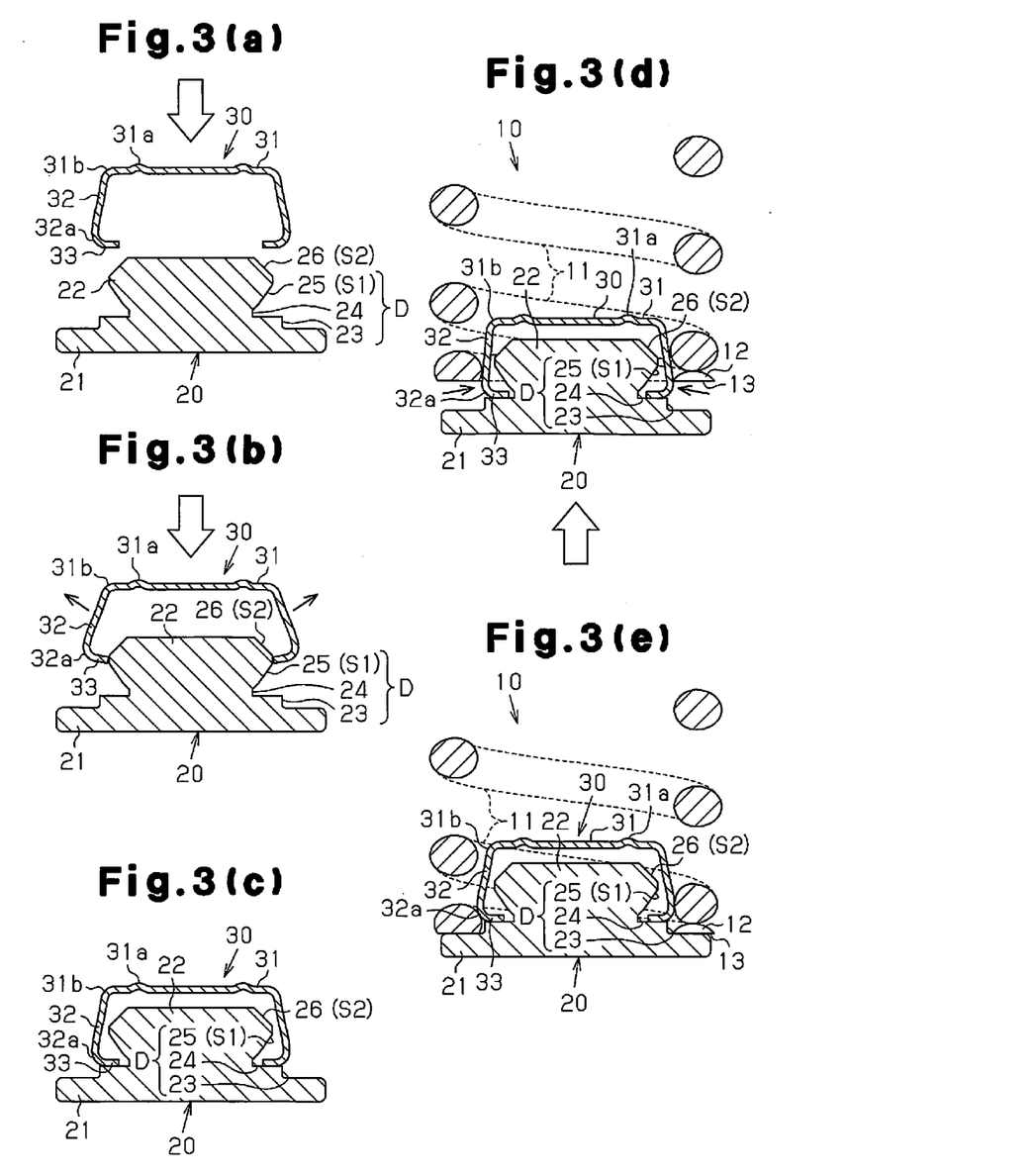
FIGS. 3(a) to 3(e) are cross-sectional views of the spring assembly showing an assembling process of the spring assembly in the first embodiment.

The leaf spring 30 is attached to the seat body 20 as follows. Specifically, the leaf spring 30 is pressed to be mounted on the shaft portion 22 of the seat body 20 as shown in FIG. 3(a). Accordingly, the tip of the locking portion 33 of each engaging piece 32 of the leaf spring 30 contacts the decreasing-diameter portion 26 of the seat body 20 and slides thereon. At this time, as shown in FIG. 3(b), each engaging piece 32 is elastically deformed radially outward of the shaft portion 22. When the locking portions 33 move over the decreasing-diameter portion 26, the respective engaging pieces 32 are restored from the elastic deformation and the locking portions 33 are loosely fitted into the groove D of the shaft portion 22 as shown in FIG. 3(c). In this state, a surface of each locking portion 33 of each engaging piece 32 facing the seat portion 21 is in contact with the large-diameter portion 23 of the seat portion 21 of the seat body 20. In this way, the leaf spring 30 is attached to the seat body 20 to prevent detachment, thereby forming the spring seat member.

Next, a process of attaching the spring seat member to the end turn portion 12 of the coil spring 10 will be described. Specifically, the seat body 20 is pressed against the end turn portion 12 to insert the leaf spring 30 into the end turn portion 12 of the coil spring 10. Accordingly, as shown in FIG. 3(d), the outer side surface of each engaging piece 32 of the leaf spring 30 contacts the inner peripheral surface of the end turn portion 12 of the coil spring 10 and slides thereon. At this time, each engaging piece 32 is elastically deformed radially inward of the shaft portion 22. When the end turn portion 12 moves over each engaging piece 32, each engaging piece 32 is restored from the elastic deformation to engage the engaging bent portion 32a with the end turn portion 12 as shown in FIG. 3(e). Accordingly, the end turn portion 12 is fitted to the large-diameter portion 23 of the seat body 20 and the end surface 13 of the end turn portion 12 contacts the surface of the seat portion 21 of the seat body 20 where the shaft portion 22 projects. In this way, the spring seat member is attached to each of the both end turn portions 12 of the coil spring 10 to assemble the spring assembly.

Operation of the first embodiment will now be described.

In the first embodiment, when attaching the leaf spring 30 to the seat body 20, the engaging piece 32 extending from each peripheral edge bent portion 31b is elastically deformed radially outward of the shaft portion 22. Since the respective engaging pieces 32 are elastically deformable independently of each other, a force necessary to attach the leaf spring 30 to the seat body 20 is relatively small.

Further, in the first embodiment, the leaf spring 30 and the seat body 20 are inserted into the end turn portion 12 with the leaf spring 30 attached to the seat body 20. At this time, each engaging piece 32 is pressed radially inward of the shaft portion 22 by the end turn portion 12 to be elastically deformed. Since the respective engaging pieces 32 are elastically deformable independently of each other, a force necessary to insert the leaf spring 30 and the seat body 20 into the end turn portion 12 with the leaf spring 30 attached to the seat body 20 is relatively small.

Further, in the first embodiment, the leaf spring 30 and the seat body 20 are inserted into the end turn portion 12 with the leaf spring 30 attached to the seat body 20. At this time, each engaging piece 32 is elastically deformed radially inward of the shaft portion 22 and, then, restored from such elastic deformation. Thus, in inserting the leaf spring 30 and the seat body 20 into the end turn portion 12 with the leaf spring 30 attached to the seat body 20, each engaging piece 32 is engaged with the end turn portion 12 in conformity with the shape of the end turn portion 12 even if there is a dimensional error of the end turn portion 12.

Further, in the first embodiment, the detachment of the spring seat member from the coil spring 10 is suppressed as described below even if a force acting to pull out the spring seat member acts on the spring seat member.

Figure 4:
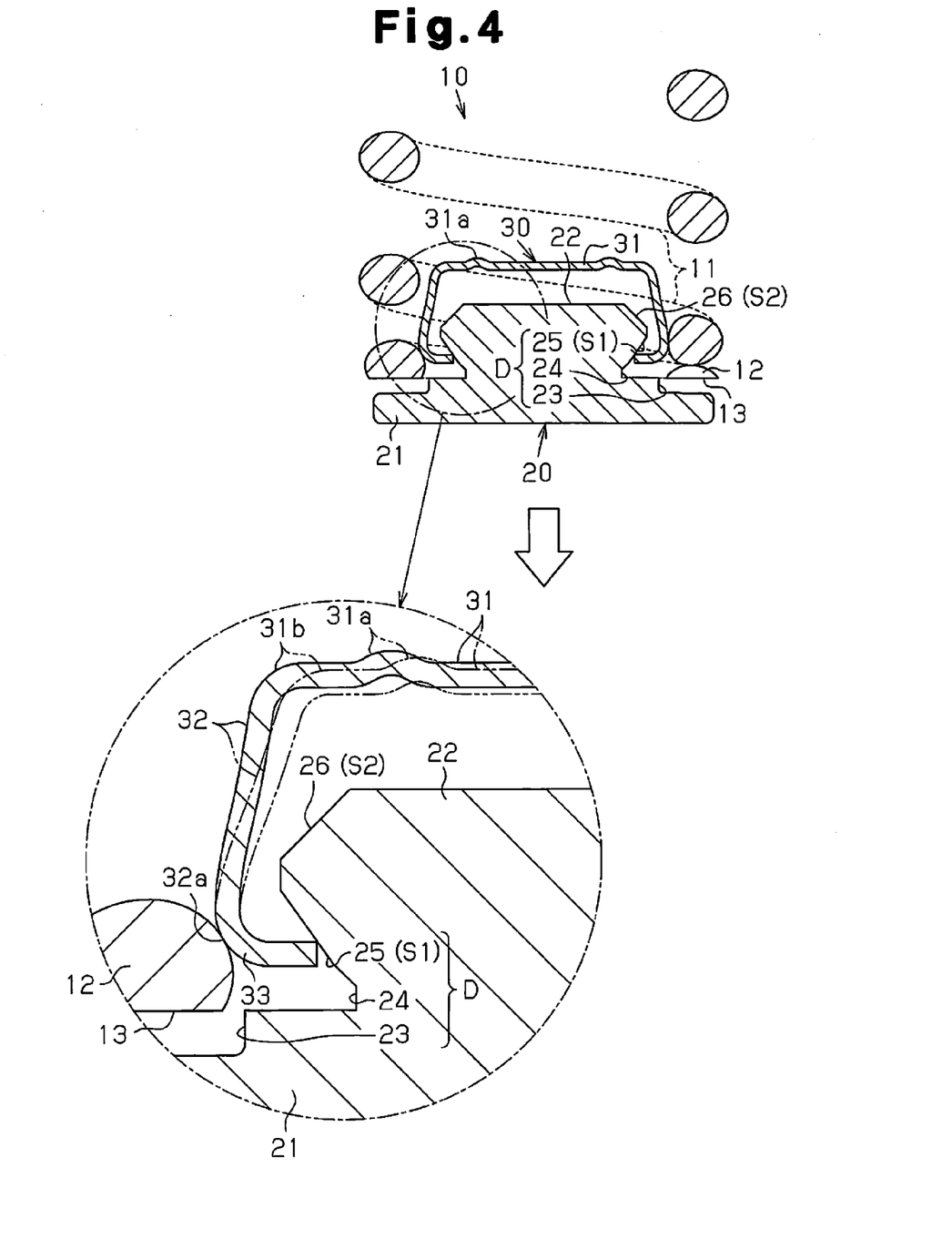
FIG. 4 is a cross-sectional view of the spring assembly when a force acting to pull out a spring seat member acts in the first embodiment.

Specifically, if a force acting to pull out the spring seat member acts on the spring seat member as shown by an arrow of FIG. 4, the end surface 13 of the coil spring 10 and the seat portion 21 of the seat body 20 are separated.

Then, the leaf spring 30 moves away from the seat body 20 together with the coil spring 10 with each engaging piece 32 kept engaged with the end turn portion 12, and the tip of each locking portion 33 contacts the inclined surface S1 of the increasing-diameter portion 25. Depending on a situation where a force acting to pull out the spring seat member acts and a state of engagement between the engaging pieces 32 and the end turn portion 12, the tips of the respective locking portions 33 do not simultaneously contact the inclined surface S1 of the increasing-diameter portion 25.

Then, the tip of each locking portion 33 tends to be displaced radially outward of the shaft portion 22 along the inclined surface S1 of the increasing-diameter portion 25 after contacting the inclined surface S1 of the increasing-diameter portion 25. Specifically, a force acting to elastically deform and separate the engaging pieces 32 from the shaft portion 22 acts on the engaging pieces 32 as a component of a force acting to pull out the spring seat member.

However, the end turn portion 12 is located radially outward of the engaging pieces 32. Thus, as shown in the enlarged view of FIG. 4, the engaging piece 32 already engaged with the end turn portion 12 is more strongly pressed against this end turn portion 12.

On the other hand, the leaf spring 30 is inclined to pivot at the engaging piece 32 not engaged with the end turn portion 12, for example, as indicated by broken lines in which a long dash alternates with a pair of short dashes of the enlarged view of FIG. 4. In accordance with such a pivoting movement, the tip of the locking portion 33 of the engaging piece 32 not engaged with the end turn portion 12 is displaced along the inclined surface S1 of the increasing-diameter portion 25. As a result, the engaging piece 32 not engaged with the end turn portion 12 also comes to be engaged with the end turn portion 12. The engaging piece 32 having come into engagement with the end turn portion 12 in this way is subjected to a force acting to elastically deform and separate the engaging piece 32 from the shaft portion 22, as a component of a force acting to pull out the spring seat member in the same manner as described above, and is more strongly pressed against the end turn portion 12.

Further, the engaging piece 32 not engaged with the end turn portion 12 may be displaced radially outward along the inclined surface S1 of the increasing-diameter portion 25 after the tip of the locking portion 33 contacts the inclined surface S1 of the increasing-diameter portion 25. In this case, the engaging piece 32 is engaged with the end turn portion 12 after a part thereof between the peripheral edge bent portion 31b and the tip is elastically deformed away from the shaft portion 22. Further, the engaging piece 32 is subjected to a force acting to elastically deform and separate the engaging piece 32 from the shaft portion 22, as a component of a force acting to pull out the spring seat member, and is more strongly pressed against the end turn portion 12.

In this way, the attachment orientation of the leaf spring 30 in relation to the seat body 20 is autonomously adjusted. Specifically, the locking portions 33 of the engaging pieces 32 slide along the inclined surface S1 of the increasing-diameter portion 25, whereby more engaging bent portions 32a of the engaging pieces 32 are engaged with the end turn portion 12.

In the first embodiment, when attaching the leaf spring 30 to the seat body 20, the tip of the locking portion 33 functions as a point of effort and the peripheral edge bent portion 31b acts as a point of load. Since the peripheral edge bent portion 31b is more distant from the tip of the locking portion 33 than the engaging bent portion 32a, the engaging piece 32 is elastically deformed with a smaller force as compared with the locking portion 33, which is deformed with the engaging bent portion 32a as a point of load.

On the other hand, in the first embodiment, if the force acting to pull out the spring seat member acts on the spring seat member, the tip of the locking portion 33 functions as a point of effort and the engaging bent portion 32a acts as a point of load. Since the engaging bent portion 32a is closer to the tip of the locking portion 33 than the peripheral edge bent portion 31b, the locking portion 33 can withstand a larger force as compared with the engaging piece 32 that is deformed with the peripheral edge bent portion 31b as a point of load.

As described above, the following advantages are achieved according to the first embodiment.

(1) If a force acting to pull out the spring seat member acts on the spring seat member, larger parts of the engaging pieces 32 are engaged with the end turn portion 12 by the synergistic effect of the deformation of the engaging pieces 32 and the autonomous adjustment relating to the attachment orientation of the leaf spring 30. Thus, the concentration of a force on limited areas of the engaged parts of the engaging pieces 32 and the end turn portion 12 is suppressed and the force is distributed and made uniform. As a result, the engaging pieces 32 are less likely to be locally broken or deformed radially inward of the shaft portion 22 to be disengaged from the end turn portion 12. Consequently, the detachment of the spring seat member from the coil spring 10 is effectively suppressed.

(2) A plurality of engaging pieces 32 are formed at equal angular intervals in the circumferential direction along the peripheral edge of the base portion 31 and the slits 34 are formed between adjacent engaging pieces 32. Thus, the parts of the respective engaging pieces 32 before the peripheral edge bent portions 31b are elastically deformed independently of each other and away from the shaft portion 22. Hence, a force for attaching the leaf spring 30 to the seat body 20 is reduced, wherefore the attaching operation thereof is facilitated.

Further, since a force exerted in inserting the leaf spring 30 and the seat body 20 into the end turn portion 12 with the leaf spring 30 attached to the seat body 20 is reduced, the operation of attaching the spring seat member to the coil spring is also facilitated.

Furthermore, since the engaging pieces 32 can be elastically deformed independently of each other, each engaging piece 32 is elastically deformed in conformity with the shape of the end turn portion 12 even if there is a dimensional error of the end turn portion 12. Thus, the engaging pieces 32 are more reliably engaged with the end turn portion 12.

(3) Further, in the engaging pieces 32, the engaging bent portions 32a, which have a relatively high rigidity, are engaged with the end turn portion 12. Thus, damage to the parts of the engaging pieces 32 engaged with the end turn portion 12 is also effectively suppressed.

(4) The base portion 31 of the leaf spring 30 is formed with the reinforcing rib 31a. Thus, also when a force acting to pull out the spring seat member acts on the spring seat member, the deformation of the base portion 31 of the leaf spring 30 is suppressed and the detachment of the spring seat member caused by this is effectively suppressed.

Further, also when the engaging pieces 32 of the leaf spring 30 are elastically deformed, the breakage of the base portion 31 of the leaf spring 30 is suppressed and the detachment of the spring seat member caused by this is effectively suppressed.

(5) If a force acting to pull out the spring seat member acts on the spring seat member, the tip of the locking portion 33 acts as a point of effort and the engaging bent portion 32a closer to the tip of the locking portion 33 than the peripheral edge bent portion 31b acts as a point of load. Thus, the spring seat member can withstand a larger force and the detachment of the spring seat member from the coil spring 10 is effectively suppressed.

Second Embodiment

A second embodiment of the present invention will now described based on FIGS. 5 to 8. The same components in the second embodiment as those in the first embodiment are given the same reference numerals and description thereof is omitted.

Next, a spring seat member of the second embodiment will be described.

Figure 5:
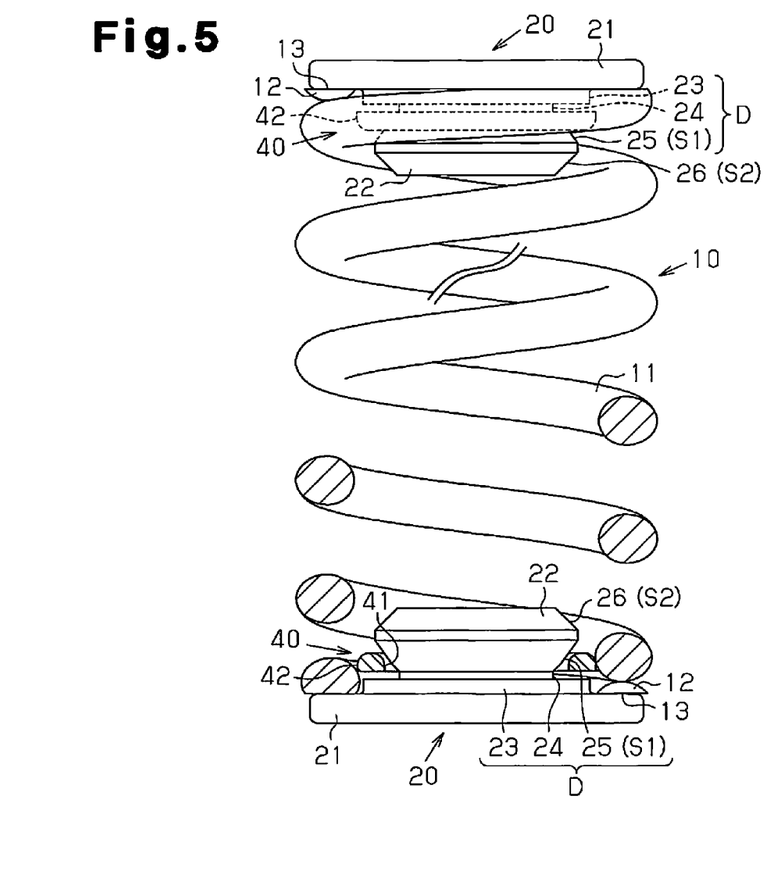
FIG. 5 is a partially cut-away cross-sectional view of a spring assembly of a second embodiment.
Figure 6:
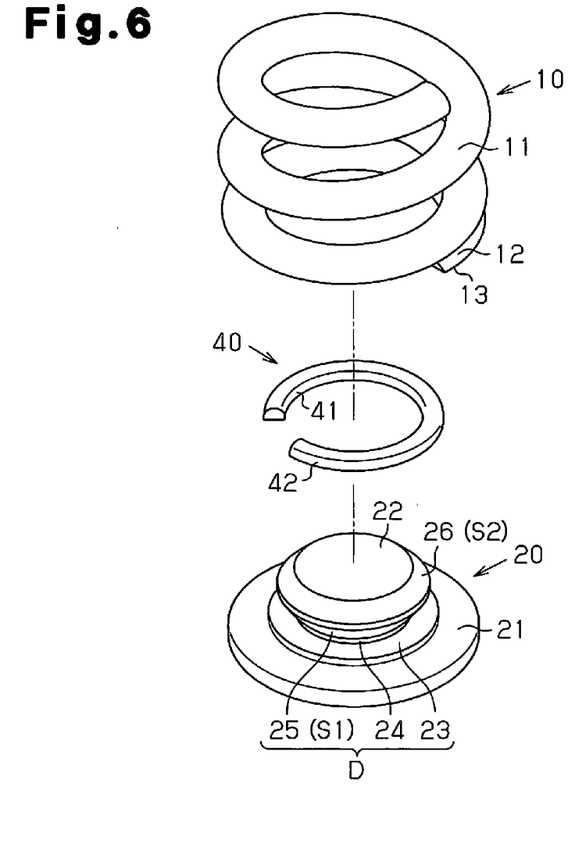
FIG. 6 is an exploded perspective view of the spring assembly of the second embodiment.

As shown in FIGS. 5 and 6, the spring seat member of the second embodiment is composed of two components, i.e., a seat body 20 and a ring member 40 attached to the seat body 20. In the second embodiment, the ring member 40 acts as an attachment member. The ring member 40 is a C-ring made of metal and elastically deformable in the radial direction. Further, a cross-section of the ring member 40 is formed by a base, which is a straight line, and a semicircular outline, and corner parts are provided on the opposite ends of the base. The inner diameter of the ring member 40 is set to be smaller than the largest outer diameters of an increasing-diameter portion 25 and a decreasing-diameter portion 26 and larger than the outer diameter of a small-diameter portion 24. Further, the outer diameter of the ring member 40 is set to be larger than the largest outer diameters of the increasing-diameter portion 25 and the decreasing-diameter portion 26. Further, the ring member 40 is formed to have an outer diameter larger than the inner diameter of an end turn portion 12 of a coil spring 10 in a state where this ring member 40 is not elastically deformed. Further, the outer diameter of the ring member 40 is set such that the ring member 40 is engageable with the inner periphery of the end turn portion 12 in an elastically deformed state. The ring member 40 can be formed, for example, by processing a wire material by a coiling machine.

Figure 7:
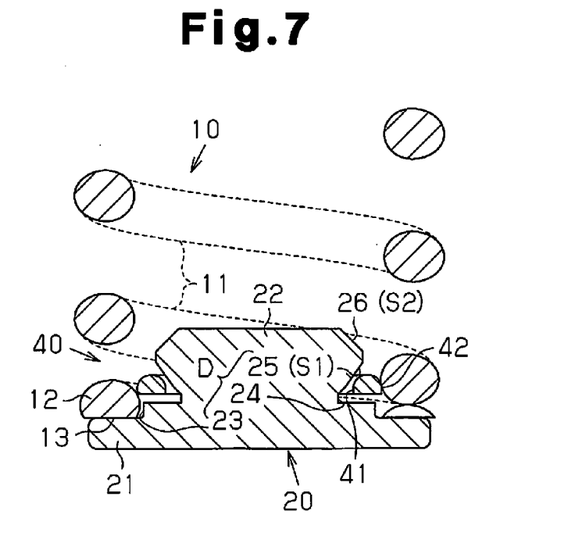
FIG. 7 is a cross-sectional view of the spring assembly showing an assembling process of the spring assembly in the second embodiment.

As shown in FIG. 7, the ring member 40 is attached to the seat body 20 as follows. Specifically, the ring member 40 is pressed to be mounted on a shaft portion 22 of the seat body 20. Accordingly, the ring member 40 contacts the decreasing-diameter portion 26 of the shaft portion 22 and slides thereon. At this time, the ring member 40 is deformed to be enlarged radially of the shaft portion 22. When moving over the decreasing-diameter portion 26, the ring member 40 is restored from the elastic deformation and an inner peripheral part 41 thereof is loosely fitted into a groove D. In this way, the ring member 40 is attached to the seat body 20 to prevent detachment, thereby forming the spring seat member of the second embodiment.

Next, a process of attaching the spring seat member of the second embodiment to the end turn portion 12 of the coil spring 10 will be described. Specifically, the seat body 20 is pressed against the end turn portion 12 to insert the shaft portion 22 attached with the ring member 40 into the end turn portion 12 of the coil spring 10. Accordingly, an outer peripheral part 42 of the ring member 40 contacts the inner peripheral surface of the end turn portion 12 of the coil spring 10 and slides thereon. At this time, the ring member 40 is deformed to be reduced in size in the radial direction of the shaft portion 22. When the end turn portion 12 moves over the outer peripheral part 42 of the ring member 40, the ring member 40 is restored from the elastic deformation to engage the corner parts of the outer peripheral part 42 of the ring member 40 with the end turn portion 12. Accordingly, the end turn portion 12 is fitted to the large-diameter portion 23 of the seat body 20 and an end surface 13 of the end turn portion 12 contacts a surface of a seat portion 21 of the seat body 20. In this way, the spring seat member of the second embodiment is attached to each of both end turn portions 12 of the coil spring 10 to assemble the spring assembly.

Operation of the second embodiment will now be described.

In the second embodiment, the detachment of the spring seat member from the coil spring 10 can be suppressed as described below also when a force acting to pull out the spring seat member acts on the spring seat member.

Figure 8:
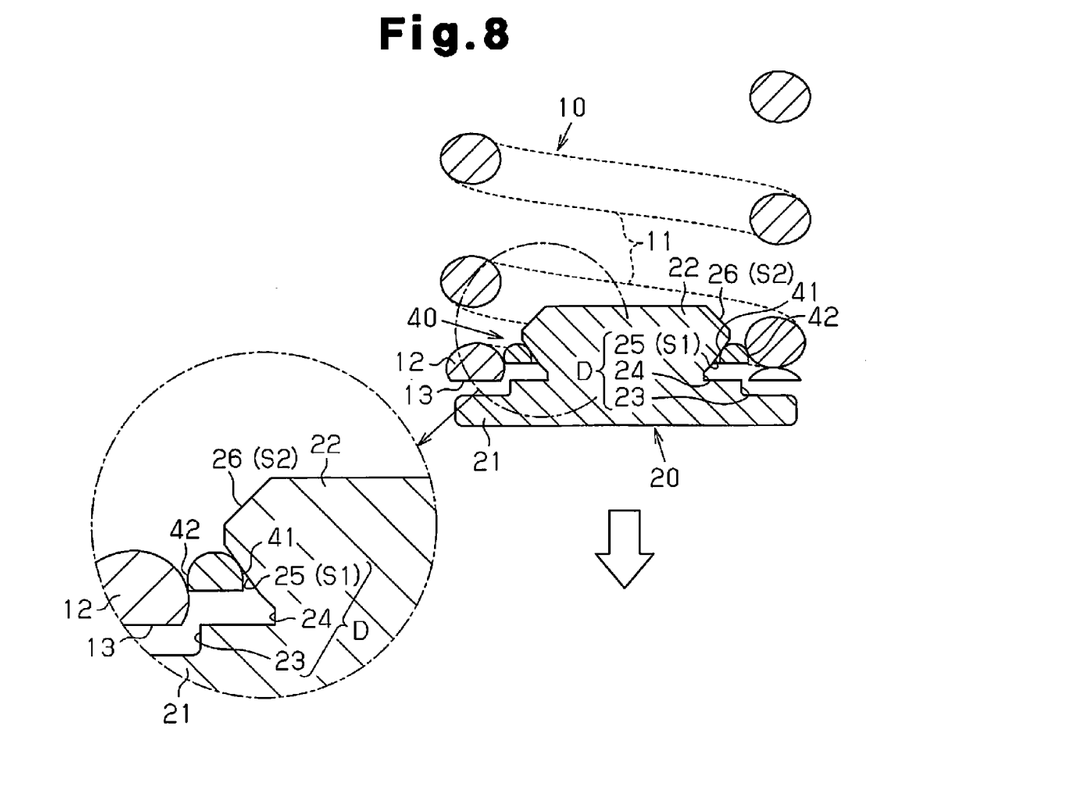
FIG. 8 is a cross-sectional view of the spring assembly when a force acting to pull out a spring seat member acts in the second embodiment.

Specifically, the end surface 13 of the coil spring 10 and the seat portion 21 of the seat body 20 are separated when a force acting to pull out the spring seat member acts on the spring seat member as shown by an arrow of FIG. 8.

Then, the ring member 40 moves away from the seat body 20 together with the coil spring 10 with the outer peripheral part 42 kept engaged with the end turn portion 12, and the inner peripheral part 41 of the ring member 40 contacts an inclined surface S1 of the increasing-diameter portion 25. In a situation where a force acting to pull out the spring seat member acts, depending on the state of engagement between the ring member 40 and the end turn portion 12, areas of the inner peripheral part 41 of the ring member 40 do not simultaneously contact the inclined surface S1 of the increasing-diameter portion 25.

Then, the inner peripheral part 41 of the ring member 40 is displaced radially outward of the shaft portion 22 along the inclined surface S1 of the increasing-diameter portion 25 after contacting the inclined surface S1 of the increasing-diameter portion 25. Specifically, a force acting to deform and radially enlarge the ring member 40 acts on the ring member 40, as a component of a force acting to pull out the spring seat member.

Thus, the outer peripheral part 42 already engaged with the ring member 40 is more strongly pressed against the end turn portion 12 as shown in the enlarged view of FIG. 8. Further, the outer peripheral part 42 of the ring member 40 on the right side of FIG. 8 is more strongly pressed against the end turn portion 12 if already engaged with the end turn portion 12.

On the other hand, if the outer peripheral part 42 of the ring member 40 on the right side of FIG. 8 is not engaged with the end turn portion 12 or, although not illustrated, if the outer peripheral part 42 of the ring member 40 on the back side of the plane of FIG. 8 is not engaged with the end turn portion 12, the ring member 40 is inclined to pivot while the part of the ring member 40 engaged with the end turn portion 12 is kept engaged. In accordance with such a pivoting movement, the inner peripheral part 41 of the ring member 40 corresponding to the outer peripheral part 42 of the ring member 40 not engaged with the end turn portion 12 is displaced along the inclined surface S1 of the increasing-diameter portion 25. As a result, the outer peripheral part 42 of the ring member 40 not engaged with the end turn portion 12 also comes into engagement with the end turn portion 12.

In this way, the attachment orientation of the ring member 40 with relation to the seat body 20 is autonomously adjusted. Specifically, the inner peripheral part 41 of the ring member 40 not engaged with the end turn portion 12 slides on the inclined surface S1 of the increasing-diameter portion 25, whereby a larger part of the outer peripheral part 42 of the ring member 40 is engaged with the end turn portion 12.

As described above, the following advantages are achieved according to the second embodiment.

(6) If a force acting to pull out the spring seat member acts on the spring seat member, the inner peripheral part 41 of the ring member 40 that contacts the increasing-diameter portion 25 is displaced radially outward along the inclined surface S1. Specifically, a force acting to deform and radially enlarge the ring member 40 acts on the ring member 40 as a component of a force acting to pull out the spring seat member. As a result, the ring member 40 is less likely to be locally broken or deformed to be radially reduced in size and disengaged from the end turn portion 12. Consequently, the detachment of the spring seat member from the coil spring 10 is effectively suppressed.

(7) Since the inner peripheral part 41 of the ring member 40, which contacts the increasing-diameter portion 25, has a curved surface, the ring member 40 is easily displaced radially outward when a force acting to pull out the spring seat member acts. Specifically, a force acting to deform and radially enlarge the ring member 40 reliably acts on the ring member 40 as a component of a force acting to pull out the spring seat member. On the other hand, since the outer peripheral part 42 of the ring member 40 includes the corner part, the engaged state of the ring member 40 with the end turn portion 12 is reliably maintained when a force acting to pull out the spring seat member acts.

Each embodiment described above may also be carried out in the following manners by being appropriately modified.

Figure 9:
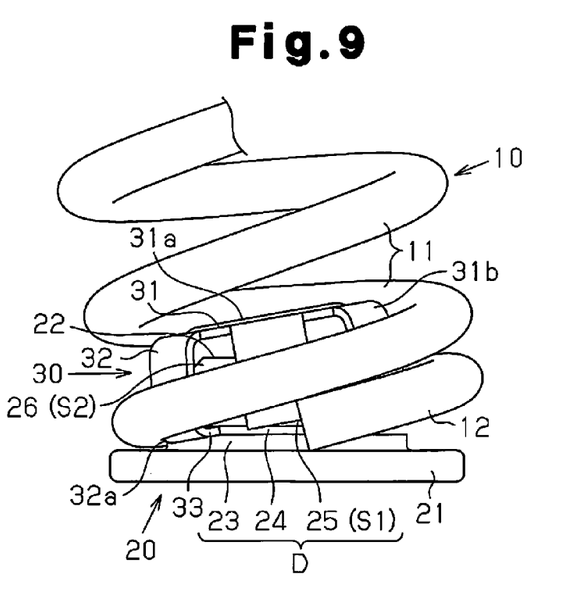
FIG. 9 is a front view of a spring assembly of a modification.

Although the opposite ends of the coil spring 10 have an end surface processed into a flat surface by grounding in each embodiment, grounding does not necessarily need to be applied to the ends of the coil spring 10 as shown in FIG. 9.

Figure 10:
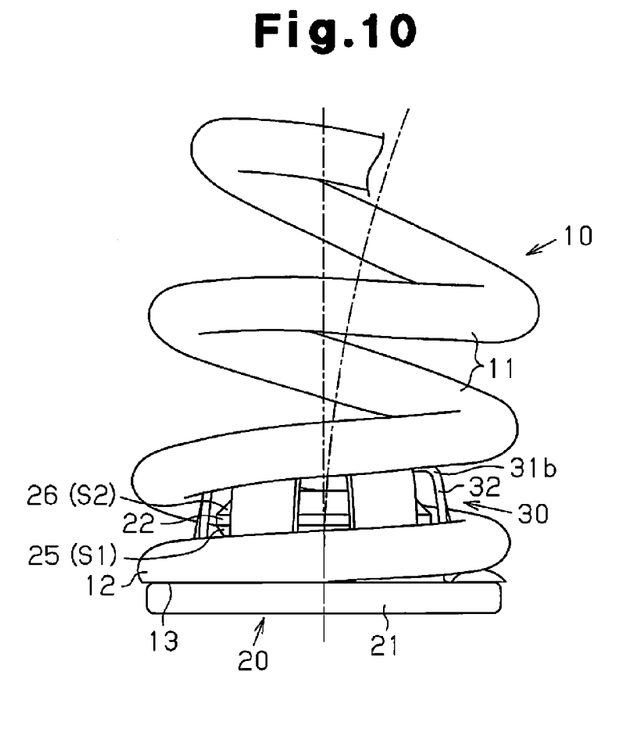
FIG. 10 is a front view of a spring assembly of another modification.

In each embodiment, an arcuately extending coil spring 10 such as an arc spring may be used as shown in FIG. 10.

In each embodiment, the shaft portion 22 may be composed of two components. For example, the shaft portion 22 may be composed of a cylindrical component, which includes a large-diameter portion 23 and a small-diameter portion 24, and a C-ring-shaped component, which is configured to be fitted to that cylindrical component and includes an increasing-diameter portion 25 and a decreasing-diameter portion 26. In this case, instead of the C-ring-shaped component including the increasing-diameter portion 25 and the decreasing-diameter portion 26, a component formed into a circular ring shape by connecting both ends of a linearly extending coil spring such as a coil expander can be used. In such a configuration, inclined surfaces respectively corresponding to the increasing-diameter portion 25 and the decreasing-diameter portion 26 can be formed on the outer peripheral surface of that component and advantages similar to those of the above illustrated embodiments are achieved.

In each embodiment, the configuration of the shaft portion 22 can be arbitrarily changed as long as the shaft portion 22 is formed with the inclined surface S1 corresponding to the increasing-diameter portion 25. For example, the large-diameter portion 23 of the shaft portion 22 does not necessarily need to be formed. The decreasing-diameter portion 26 may be replaced by a cylinder similar to the small-diameter portion 24.

In each embodiment, the groove D does not necessarily need to be formed over the entire circumference of the shaft portion 22. For example, the groove D may be formed only in a part of the outer periphery of the shaft portion 22 or may be formed at a plurality of spaced-apart positions of the outer periphery of the shaft portion 22.

In each embodiment, it is sufficient to form an inclined surface on the increasing-diameter portion 25, and the inclined surface may be a curved surface instead of a flat surface.

Although the spring seat member is attached to each end turn portion 12 of the coil spring 10 in each embodiment, the spring assembly can also be assembled by attaching the spring seat member to only one end turn portion 12.

In the spring assembly of each embodiment, the seat body 20, the leaf spring 30, and the ring member 40 may be made of plastic if a force acting to pull out the spring seat member is relatively small.

In the first embodiment, the leaf spring 30 may be composed of a cylindrical base tube portion and a plurality of engaging pieces 32 extending from the peripheral edge of the base tube portion.

In the first embodiment, a configuration provided with an engaging piece 32 cylindrically extending from the entire peripheral edge of the base portion 31 may be adopted.

In the first embodiment, one corresponding engaging piece 32 does not necessarily need to extend radially outward from each peripheral edge bent portion 31b of the base portion 31 and may extend along the axis of the shaft portion 22.

In the first embodiment, the number of the engaging pieces 32 is arbitrary.

In the first embodiment, the engaging bent portion 32a of each engaging piece 32 is engaged with the inner periphery of the end turn portion 12 of the coil spring 10. However, a part of each engaging piece 32 to be engaged with the inner periphery of the end turn portion 12 of the coil spring 10 is not limited to the engaging bent portion 32a. A part of the engaging piece 32 around the engaging bent portion 32a may be engaged with the inner periphery of the end turn portion 12 of the coil spring 10. Further, an arbitrary part of the outer periphery of each engaging piece 32 may be engaged with the inner periphery of the end turn portion 12 of the coil spring 10.

In the first embodiment, the locking portion 33 is formed by forming each engaging piece 32 with the engaging bent portion 32a. However, a projecting portion projecting radially inward of the shaft portion 22 may be formed on a surface of each engaging piece 32 facing the shaft portion 22 and may be used as the locking portion 33. The projecting portion may be formed at a longitudinal intermediate position of each engaging piece 32 and may be formed with a part to be engaged with the inner periphery of the end turn portion 12 of the coil spring 10 on the radially outer side of the tip of the engaging piece 32. In this case, the leaf spring 30 is preferably made of metal instead of plastic.

In the first embodiment, the leaf spring 30 does not necessarily need to be formed with the reinforcing rib 31a.

In the first embodiment, the reinforcing rib 31a of the leaf spring 30 may have another shape without being limited to an annular shape.

In the second embodiment, the ring member 40 may have a circular, polygonal, or another cross-sectional shape.

In the first embodiment, a surface of the locking portion 33 of the engaging piece 32 that contacts the increasing-diameter portion 25 may be an inclined surface inclined radially inward of the shaft portion 22 as the distance from the seat portion 21 decreases. Specifically, the locking portion 33 may be bent such that the surface that contacts the increasing-diameter portion 25 forms an inclined surface inclined radially inward of the shaft portion 22 as the distance from the seat portion 21 decreases. In this case, advantages similar to those of the first embodiment are achieved even if the wall surface of the increasing-diameter portion 25 has no inclined surface.

In the second embodiment, a surface of the inner peripheral part 41 of the ring member 40 that contacts the increasing-diameter portion 25 may have an inclined surface inclined radially inward of the shaft portion 22 as the distance from the seat portion 21 decreases. Specifically, the inner peripheral part 41 of the ring member 40 may have the inclined surface inclined radially inward of the shaft portion 22 as the distance from the seat portion 21 decreases. In this case, advantages similar to those of the second embodiment are achieved even if the wall surface of the increasing-diameter portion 25 has no inclined surface.

The spring assembly of each embodiment can be applied to a damper used in a clutch disc of a manual transmission for a vehicle, a flywheel for vehicle or the like.

DESCRIPTION OF THE REFERENCE NUMERALS

10 . . . coil spring, 11 . . . coil portion, 12 . . . end turn portion, 13 . . . end surface, 20 . . . seat body, 21 . . . seat portion, 22 . . . shaft portion, 23 . . . large-diameter portion, 24 . . . small-diameter portion, 25 . . . increasing-diameter portion, 30 . . . leaf spring (attachment member), 31 . . . base portion, 31b . . . peripheral edge bent portion, 32 . . . engaging piece, 32a . . . engaging bent portion, 33 . . . locking portion, 40 . . . ring member (attachment member), 41 . . . inner peripheral part, 42 . . . outer peripheral part, S1 . . . inclined surface.

The invention claimed is:

1. A spring seat member, comprising:
a seat body including a seat portion capable of contacting an end turn portion of a coil spring and a shaft portion, which extends from the seat portion and can be arranged in the coil spring; and
an attachment member to be attached to the seat body, wherein
the spring seat member is attachable to the coil spring with the attachment member attached to the seat body,
the attachment member includes an engaging portion that is selectively elastically deformable radial inward and outward of the shaft portion,
the shaft portion includes a groove extending in a circumferential direction thereof on the outer periphery of the shaft portion,
when the attachment member is attached to the seat body, the engaging portion is elastically deformed radially outward of the shaft portion, whereby the attachment member is movable along the shaft portion of the seat body until the engaging portion is loosely fitted into the groove of the shaft portion,
when the attachment member is attached to the coil spring together with the seat body, the engaging portion is elastically deformed radially inward of the shaft portion, whereby the spring seat member can be inserted into the end turn portion of the coil spring, and the engaging portion is restored from the radially inward elastic deformation to be engaged with the end turn portion after insertion,
the groove has an inner wall facing the seat portion,
the inner wall has an inclined surface that is inclined radially outward of the shaft portion as the distance from the seat portion in an extending direction of the shaft portion increases,
the attachment member is hollow, has a truncated conical external appearance, and includes a circular base portion and a plurality of engaging pieces that extends from a peripheral edge of the base portion and forms the engaging portion,
each engaging piece is so bent that a distal end thereof extends toward the shaft portion in a bent part,
the distal ends of the engaging pieces are loosely fitted into the groove, and
the bent parts of the engaging pieces are engageable with the end turn portion.

2. A spring assembly comprising the spring seat member according to claim 1 and a coil spring, wherein the spring seat member is attached to an end turn portion of the coil spring.

\* \* \* \* \*